July 29, 1969     P. T. GORMAN ET AL     3,457,622
METHOD OF INSTALLING A SEALING MEANS IN
A CRYOGENIC TANKER CONSTRUCTION
Original Filed Feb. 24, 1965

INVENTORS
PAUL T. GORMAN
AUGUSTUS B. SMALL

ATTORNEY

United States Patent Office 3,457,622
Patented July 29, 1969

3,457,622
METHOD OF INSTALLING A SEALING MEANS IN A CRYOGENIC TANKER CONSTRUCTION
Paul T. Gorman, Chatham, and Augustus B. Small, Westfield, N.J., assignors to Esso Research and Engineering Company, a corporation of Delaware
Original application Feb. 24, 1965, Ser. No. 434,777, now Patent No. 3,315,628, dated Apr. 25, 1967. Divided and this application Dec. 7, 1966, Ser. No. 619,089
Int. Cl. B23q 17/00; B21d 39/00
U.S. Cl. 29—405   6 Claims This application is a division of application Ser. No. 434,777, filed Feb. 24, 1965, now Patent No. 3,315,628.

The present invention relates to tankers employed in the marine transportation of cryogenic cargoes and more particularly to a flexible seal construction for a cargo tank dome projecting through a tanker deck from a cargo hold below.

In the storage and transportation of cargoes, such as liquefied natural gases maintained at atmospheric pressures, the extremely low temperatures encountered in service present many problems in design that are not otherwise encountered in conventional tankers. Thus, for example, it is necessary to protect the ship structure of a cryogenic cargo carrier from the deleterious supercooling temperatures of the cargo which would embrittle the mild steel structural plate if permitted to come into contact therewith. At the same time, it is necessary to prevent heat losses that would tend to warm up and to vaporize the cargo. Additionally, provision must be made for relative displacement between the ship structure and the cargo tank structure, which undergoes significant charges in dimension when subjected to extreme temperature changes which range in the case of liquefied methane, for example, for "warmed up" (ambient) temperatures of approximately 100° F. to "chilled down" temperatures of approximately −258° F.

It is an object of the present invention to provide a new and improved seal construction for a dome of a cryogenic cargo tank having an extent of projection above deck which varies from a predetermined maximum to a predetermined minimum in accordance with the service condition of the tank. More specifically, the dome has a maximum projection when the tank is unloaded or in a relatively warm state and has a minimum projection when the tank is chilled due to being laden with a liquefied gas cargo.

In a accordance with the invention, a sealing ring of an impervious elastomeric material capable of at least one hundred percent elongation, is fastened to the cylindrical dome of a cargo tank in a predetermined plane that substantially coincides with that of the deck through which the dome projects when the cargo tank is chilled down and contracted by the contained liquefied gas cargo. Accordingly, when the tank is loaded and contracted by the cold cargo and its dome tends to assume a position of minimum projection above deck, the planar sealing ring will be in one substantially flat, horizontal plane and will be minimumly mechanically stressed. This is of importance, since the sealing ring must be capable of withstanding the thermal stresses of the intense cold as well as providing thermal insulation for the cargo tank. Moreover, at least in some cases, the optimum thermal insulating properties of the elastomeric sealing ring material are realized when the material is unelongated.

Upon warming of the tank by the removal of its cargo and the subsequent elevation of the dome due to tank expansion, the connection between the dome and the deck will be maintained and the tank expansion will be accommodated through the elongation of the elastic sealing ring.

For a more complete understanding of the present invention, reference should be made to the following detailed description taken in conjunction with the accompanying drawing in which.

Figure 1:
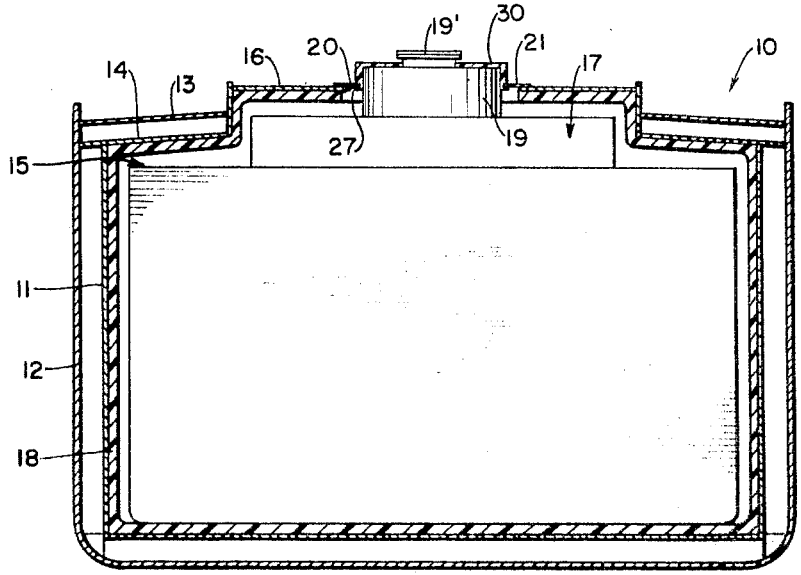
FIG. 1 is a transverse cross-sectional view of a tanker and cargo tank sealed by a planar sealing ring embodying the inventive principles.

A typical environment for the sealing ring of the invention is a double hulled tanker 10, having inner and outer hulls 11, 12 and upper and lower deck plates, 13, 14, which define a cargo space 15 below its main deck 16. A cargo tank 17, advantageously of a metal such as aluminum or stainless steel, which retains its ductility at cryogenic temperatures, is independently supported in the cargo space 15. As shown, thermal insulation 18 is applied to the inside of the inner hull structure to protect the same from the deleterious embrittling effects of the cold cargo and to insulate the cargo to prevent is vaporization. Moreover, the insulation 18 may be of predetermined liquid tight construction and of sufficient strength to constitute an auxiliary or secondary cargo barrier in accordance with the accepted practice of providing plural impermeable barriers between the cargo and ship structure for increased safety and reliability.

Figure 2:
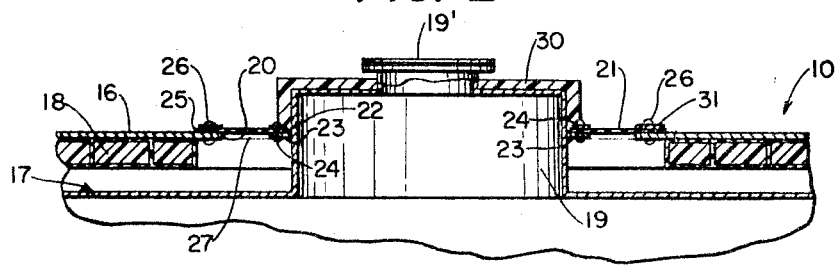
FIG. 2 is an enlarged, fragmentary view showing the relationship of the sealing ring to the cargo tank dome when the latter is in a chilled down, minimally projected condition.
Figure 3:
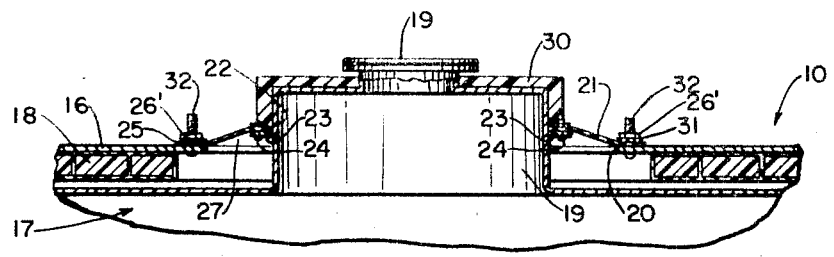
FIG. 3 is an enlarged, fragmentary view showing the relationship of the sealing ring to the cargo tank dome when the latter is in a warmed up, maximally projected condition.

In accordance with conventional practice, the cargo tank 17 includes a cylindrical dome 19, having an insulated cover 19', which projects concentrically through a circular access opening 20 formed in the main deck 16. As will be understood, the tank 17 undergoes expansion and contraction when being emptied or "warmed up" and when being loaded or "chilled down," respectively, causing the dome 19 to be alternately elevated to a predetermined maximum projection relative to the deck 16 (FIG. 3) or lowered to a predetermined minimum projection relative to the deck 16 (FIG. 2). As shown, the portions of the dome 19 which lie above the flange 23 may be externally covered with thermal insulation 30 to protect the ship's crew and to prevent heat transfer to the tank from the ambient atmosphere.

As an important aspect of the invention, a cargo impervious, elastic sealing ring 21 is provided to seal the cargo space 15 and to insulate the tank 17 in the area of the opening 20, which ring may be fabricated from a urethane foam material having at least one hundred percent elongation and possessing optimum thermal insulating properties when mechanically unstressed.

Installation of the sealing ring 21 is accomplished in accordance with another important aspect of the invention by initially fastening the inner diameter 22 of the ring to a radially extending circumferential flange 23 by means of suitable fasteners 24 while the tank is warmed up. The outer diameter 25 of the ring is left loose until the tank is chilled down upon its initial loading. Upon being contracted by the supercooling effects of the cargo, the radial flange 23 will be lowered into the general plane of the deck 16 as shown in FIG. 2. At this time, the outer diameter of the ring is secured with suitable fasteners 26 to the periphery of the deck opening 20. As will be understood and as an important aspect of the invention, the sealing ring is subjected to substantially no mechanical stresses when the tank 17 is in its chilled down condition and the dome 19 is minimally projected. Moreover, in this condition, the unstressed ring 21 will be unelongated and, in accordance with the inventive principles, will provide maximum thermal insulation of the tank 17.

When the tank 17 is subsequently unloaded, causing it to be warmed up and to be expanded, the gap 27 between the radial flange 23 and the periphery of the access opening 18 will be increased. However, the elasticity of the sealing ring will more than accommodate the change in the gap without interrupting the connection of the ring between the deck 16 and the dome 17.

As an alternative to the above-described method of installation, the sealing ring 21 may be completely installed while the tank is warmed up. This may be accomplished by fastening the outer periphery of the ring 21 to an extrinsic flange plate 31 having a series of guide holes disposed about its periphery, while the plate 31 is supported by an overhead handling mechanism such as a crane, sling, or the like. Thereafter, the guide holes of the plate 31 are placed in registry with studs 32 or the like projecting upwardly from the deck 16, before the plate 31 and sealing ring 21 are lowered into proper sealing contact with the deck and are secured thereto by tightening down of nuts 26' associated with the studs. This will slightly elongate the sealing ring 21 and will impart a tensile pre-stress thereto which, in accordance with the principles of the invention, should be of a predetermined value adequate to compensate for the subsequent displacement of the tank and contraction of the ring 21 in a manner that will assure effective relaxation and minimal stressing thereof when the tank is cooled down. It should be understood that the pre-stress imparted to the ring may be controlled by careful adjustment of the spaced relation of the dome flange 23 to the deck 16 in the warmed up condition.

Furthermore, to facilitate installation and/or later replacement of the sealing rings 21 utilizing either of the above-described methods, i.e., cold or warm installation, the sealing ring 21 may be provided with a discontinuity extending radially thereof from the inner to outer perimeter. Once in place about the dome 19, the discontinuous seals may be made continuous, in situ, by use of portable vulcanizing equipment.

As will be appreciated, the new and improved sealing ring 21 of the present invention provides an extremely efficient cargo-impervious seal between a cargo tank dome and the ship deck which seal is of maximum thermal effectiveness when the tank is loaded and chilled down. It should be well understood that the efficacy of the sealing and insulating arrangement is accomplished by completing the installation of the sealing ring in a manner which assures that the sealing ring is mechanically free of stress under service conditions.

It should be further understood that the specific modes of construction and methods of installation herein illustrated and described are intended to be representative only, as certain changes may be made therein without departing from the clear teachings of the disclosure. Accordingly, reference should be made to the following appended claims in determining the full scope of the invention.

What is claimed is:

1. A method of installing a sealing means in the space between an access opening in a deck and a temperature-responsively displaceable dome of a cryogenic cargo tank projecting therethrough, which includes the steps of:
   (a) securing a circumferential sealing means to said dome while said dome is relatively warm and in a first predetermined position in relation to said deck,
   (b) filling said tank with a cryogenic liquid to chill said dome and to displace said dome to a second predetermined position in relation to said deck, and
   (c) securing said sealing means to said deck while maintaining said dome in said second predetermined position and maintaining said sealing means substantially free of stress.

2. The method of claim 1, in which
   (a) said sealing means is initially discontinuous,
   (b) said sealing means is vulcanized in the region of discontinuity to eliminate the same and make said ring continuous before said ring is subjected to stressing by displacement.

3. A method of installing a gas-tight sealing means in the space between an access opening in a deck and dome projecting therethrough which is displaceable between first and second predetermined positions relative to said deck in response to a predetermined temperature change, which includes the steps of
   (a) securing an elastomeric circumferential sealing means to one of said dome and said deck while said dome is relatively warm and in said first predetermined position,
   (b) securing said circumferential sealing means to the other of said dome and said deck while elongating said sealing means and imparting thereto a predetermined pre-stress of magnitude sufficient to compensate for a subsequent contraction and reduction in stress when said dome is displaced to said second predetermined position upon being chilled down,
   (c) whereby said sealing ring means is subjected to a substantial minimum of mechanical stress under service conditions, when said dome is in said second predetermined position.

4. The method of claim 3, in which
   (a) said sealing means is secured initially to said dome and thereafter to said deck.

5. The method of claim 3 in which
   (a) said sealing means is initially discontinuous,
   (b) said sealing means is vulcanized in the region of discontinuity to eliminate the same and make said ring continuous before said ring is subjected to stressing by displacement.

6. A method of installing a gas-tight sealing means in the space between an access opening in a deck and dome projecting therethrough which is displaceable between first and second predetermined positions relative to said deck in response to a predetermined temperature change, which includes the steps of
   (a) securing an elastomeric circumferential sealing means to one of said dome and said deck while said dome is relatively warm and in said first predetermined position,
   (b) securing said circumferential sealing means to the other of said dome and deck while maintaining said sealing means under a predetermined condition of stress,
   (c) said predetermined condition of stress being such that said sealing means is subjected to predetermined elongation when said dome is in said first predetermined position but is substantially free from elongation when said dome is in said second predetermined position.

References Cited

UNITED STATES PATENTS

| | | | |
|---|---|---|---|
| 2,600,015 | 6/1952 | McLaughlin | 114—74 X |
| 2,807,143 | 9/1957 | Schnellhardt | 114—74 X |
| 2,971,656 | 2/1961 | Schoffner | 29—446 X |
| 3,108,366 | 10/1963 | Duffy | 29—405 |
| 3,246,394 | 4/1966 | Meyer | 29—446 |
| 3,377,226 | 4/1968 | Renwick | 277—1 X |

CHARLIE T. MOON, Primary Examiner

U.S. Cl. X.R.

29—446, 455; 62—45; 277—1